Patented July 28, 1942

2,290,956

UNITED STATES PATENT OFFICE 2,290,956

RETARDING SETTING RATE OF PORTLAND CEMENT

Ernst Gruenwald, New York, and Harvey R. Durbin, New Rochelle, N. Y., and William H. Tilley, Houston, Tex., assignors to Lone Star Cement Corporation, New York, N. Y., a corporation of Maine No Drawing. Application June 15, 1940, Serial No. 340,770

14 Claims. (Cl. 106—91)

This invention relates to Portland and Portland type cements with a retarded setting rate, and to methods of retarding the rate of setting of such cements at elevated temperatures. More particularly, the invention relates to retarding the setting rate of Portland or Portland type cements at elevated temperatures by the presence of a small quantity of casein when the cement is mixed with water.

In the cementing of oil wells and similar operations, Portland cement is usually mixed with about 40 to 50% of water, by weight, and the grout or slurry thus formed is introduced into the well casing and pumped to the place where it is desired to harden. Ordinary Portland cements are suitable for this practice in oil wells that are not very deep or in cases where the grout does not have to be pumped very far. But in deeper wells, such as those 6000–12,000 feet or more in depth, longer periods of time are required for pumping the grout into position and high temperatures are frequently encountered which accelerate the setting rate of the cement, so that grouts made with ordinary Portland cements become too stiff for pumping and set before reaching their ultimate location.

Portland cement when mixed with water to form a paste sets much faster at elevated temperatures than it does at normal temperatures because, at the higher temperatures, hydration of the cement constituents begins immediately and the paste is stiffened sufficiently to prevent easy deformation in a very short time. Also, in oil well cementing practice, the grout is usually passed down through an oil well casing and then upward around the lower end of the casing to the position where it is to harden, narrow channels being frequently encountered at various stages which make pumping of the grout virtually impossible if premature stiffening of the cement mix has taken place.

Another problem in pumping Portland cement grouts into location in a deep oil well is the tendency of the cement, after mixing with water, to separate from the water by settling. In order to avoid this objectionable settling, the cement has to be ground very fine, for example, to a specific surface of 1700 sq. cm. per gram or more. The finer the cement is ground, however, the more rapidly it sets after mixing with water because of the increased reactive surface of the cement that is exposed in the final product. It is particularly difficult, therefore, to make a Portland cement that has a sufficiently slow setting rate when finely ground to be satisfactory for use in deep oil wells where higher temperatures that also accelerate the setting action are encountered.

Various retarders have been proposed to alter the setting rate of cements, but many of the retarding agents that are effective in slowing the setting rate of the cement have some other detrimental effect, such as lowering the ultimate strength of the hardened cement.

It is an object of our invention to provide a Portland or Portland type of cement having a very slow rate of setting at elevated temperatures, even when the cement is ground to such a fineness that it will not settle out from the ordinary grout used in oil well cementing practice.

Another object of our invention is to retard the setting rate of Portland cement by the presence of a small quantity of casein when the cement is mixed with water.

A further object of our invention is to retard the setting rate of Portland cement by the use of a mixture of casein and a reagent that inhibits the foaming tendency of the casein when mixed with water in the presence of a cement.

Another object is the provision of methods of preparing and using Portland cements having the foregoing properties.

We have found that a small quantity of casein, either mixed in a finely divided state with a dry cement or added to the cement and water at the time the cement is mixed, produces a strong retarding effect on the rate of setting of the cement at elevated temperatures. Casein is not considered to be soluble in water by itself, but it is soluble in water in the presence of most alkalies, at least to a sufficient extent to obtain a uniform dispersion of the casein in the water. Ordinary Portland cements usually contain a small quantity of free lime and when mixed with water are definitely alkaline. It is believed likely therefore, that the cement constituents have a solubilizing effect on the casein and promote its uniform dispersion throughout a grout or slurry, even though no additional alkaline materials are used.

Exactly what reactions take place by reason of the presence of the casein in a cement-water slurry to delay the setting of the cement is not fully understood. The presence of the casein in such a water slurry does not cause the cement to settle out any more rapidly than it normally settles and does not appear to affect substantially the ultimate hardness of the cement after setting. In fact, the casein causes a certain amount of foaming when mixed with cement and water which tends to prevent settling of the cement, and if the foam produced is simply skimmed off from the top of the slurry, it is found that the slurry is cleansed to some extent by this action, with the production of a more uniform and better product after the cement is hardened.

This foaming tendency of the casein may be objectionable in certain cases, however, and it may be readily overcome if desired by adding a suitable anti-foaming agent along with the casein to the dry cement or to the water slurry when it is first mixed. Tributyl phosphate has been found to be very effective as an anti-foaming agent when employed in small quantities. Tributyl phosphate is a heavy oil and may be mixed directly with the dry casein and/or cement or may be added at any stage during the preparation of the water slurry of cement and casein. Other anti-foaming agents known to inhibit foaming tendencies on casein may also be employed. If desired, the cement and casein may be mixed with water and after the foam has been produced, it may be dissipated by spraying a small amount of an anti-foaming agent on top of the foam.

We prefer not to use more than about 0.5% of casein based on the weight of the cement on a dry basis. More than this amount increases the foaming to an objectionable extent and is uneconomical for ordinary purposes. For most purposes, 0.2% to 0.4% of casein produces sufficient retarding of the setting rate of the cement.

Any of the usual commercial caseins, either rennet or acid precipitated caseins, may be employed for purposes of this invention.

While various anti-foaming agents such as octyl alcohol, capryl alcohol and the like may be used in conjunction with the casein and cement according to our invention, we prefer to use a vacuum distilled tributyl phosphate because it reduces the foaming effectively even when used in amounts as small as 0.1% or even less by weight of the cement. For economic reasons alone, it is desirable to add as little of a relatively expensive anti-foaming agent as is needed, and therefore tributyl phosphate, which is particularly effective in small quantities, is preferred.

A test generally accepted for determining the amount of foaming of a cement when mixed with water is carried out by adding 30 grams of cement to 50 c. c. of distilled water in a test tube one inch in diameter. The cement and water are shaken vigorously for one minute, the sides of the tubes washed down with a small stream of water and the mixture allowed to stand for five minutes. If the column of foam in the tube after standing for five minutes is more than one half inch in height, it is generally considered that the cement is unsatisfactory for oil well purposes because of excessive foaming. The following table indicates the results obtained when this test was applied to cements prepared according to our invention and illustrates the effectiveness of tributyl phosphate as an anti-foaming agent.

Table I

|   | Cement | Casein | Tributyl phosphate | Inches of foam |
|---|---|---|---|---|
|   |   | Percent | Percent |   |
| 1 | A | 0 | 0 | 0 |
| 2 | A | 0.40 | 0 | 1.75 |
| 3 | A | 0.40 | 0.10 | 0 |

Samples 2 and 3 were prepared by grinding the casein or casein and tributyl phosphate with the cement. While it is unnecessary to use more than 0.10% of tributyl phosphate, somewhat larger amounts of other anti-foaming agents up to about 0.5% may be used.

In order to illustrate the effectiveness of casein with or without an anti-foaming agent in retarding the setting rate of cement, pumpability tests have been made using the Halliburton "consistometer" to simulate the temperatures encountered in deep oil wells. This apparatus is described in United States Patent No. 2,122,765 and consists essentially of a rotating cylindrical container provided with an internal paddle assembly fixed to a head whose movement is independent of the container. With the container filled with cement slurry, the thrust against the paddle due to rotation of the container and the viscosity of the slurry is transferred from the head of the apparatus to a pendulum lever arm by a suitable connection. The pendulum range is graduated into 10 divisions representing slurry viscosities of approximately 0–10,000 centipoises. A pull of 10 divisions on the pendulum is considered to represent the limit of pumpability for the slurry in an oil well. A constant temperature bath surrounds the container during the test.

The following table indicates the effect of retarding agents according to our invention on a commercial Portland cement as determined at different temperatures in the Halliburton consistometer. The times of pumpability given in the table are the number of minutes required for the samples to reach a pull of 10 divisions.

Table II

| Retarder | Temperature | Pumpability |
|---|---|---|
|   | °F. |   |
| 0 | 140 | 342 |
| 0.4% casein | 140 | 533 |
| 0.4% casein; 0.1% tributyl phosphate | 140 | 610 |
| 0 | 170 | 195 |
| 0.4% casein | 170 | 470 |
| 0.4% casein; 0.1% tributyl phosphate | 170 | 600 |
| 0 | 200 | 185 |
| 0.4% casein | 200 | 535 |
| 0.4% casein; 0.1% tributyl phosphate | 200 | 460 |

In order to illustrate the effect of retarding agents according to this invention on the compressive strength of Portland cements, various samples have been mixed and cured at elevated temperatures. A special apparatus was used for mixing the cement slurries because of its capacity. This apparatus was designed for testing cements in a manner similar to the Halliburton consistometer and was described in an article by Silcox and Rule in the July 29, 1935 issue of "Oil Weekly." Essentially, this "viscosimeter" is a modified ice cream freezer with one set of stationary and one set of movable paddles in a cylindrical container. The container is held stationary and a spring scale is attached to one side thereof which registers the tendency or pull of the container in its effort to rotate due to the viscosity and friction of the grout on the inside of the container. In making tests, a grout is prepared by mixing cement with 40%, by weight, of water placed in a container and the paddles are rotated at a constant speed. The temperature of the container and grout is gradually raised during the first half hour from 80° to 200° F. and thereafter held constant at 200° F. After different periods of mixing, samples of the grout were removed from the viscosimeter, formed into two inch neat cubes and cured at 200° F. The tests summarized in the following table were made with a commercial Portland cement as a control and with other samples of this cement to which had been added 0.4% of casein and 0.1% of tributyl phosphate, by weight, as a retarder. Compressive strengths are given in pounds per square inch.

Table III

| Time of mixing in minutes | With retarder | | Without retarder | |
|---|---|---|---|---|
| | Cured 1 day | Cured 3 days | Cured 1 day | Cured 3 days |
| 30 | 4,750 | 5,317 | 6,058 | 9,651 |
| 60 | 4,883 | 7,733 | 4,833 | 8,024 |
| 90 | 5,250 | 7,350 | 4,300 | 7,033 |
| 120 | 5,166 | 6,775 | 3,916 | 5,883 |
| 150 | 6,108 | 9,208 | 2,700 | 4,033 |
| 180 | 5,883 | 7,333 | | |
| 210 | 6,450 | 9,300 | | |
| 240 | 7,133 | 6,475 | | |
| 270 | 6,425 | 8,375 | | |
| 300 | 6,012 | 6,908 | | |

It was found to be impractical in this test to mix this cement without any retarder for longer than two hours and a half. A peculiar and unexpected result obtained by the use of casein according to our invention is that it actually improves the compressive strength of cement when it is mixed for relatively long periods of time and cured at elevated temperatures.

In the foregoing tests, the commercial cement employed, designated as "A" in Table I, had the following analysis. Other commercial Portland cements produce comparable results when mixed according to this invention with casein as a setting rate retarder.

| | |
|---|---|
| $SiO_2$ | 23.20 |
| $Al_2O_3$ | 3.81 |
| $Fe_2O_3$ | 7.15 |
| CaO | 62.30 |
| MgO | 1.00 |
| $SO_3$ | 1.32 |
| Loss | 1.08 |
| Free CaO | .14 |
| *Tricalcium aluminate | 0 |
| *Dicalcium ferrite | 2.04 |
| Fineness_____sq. cm. per gram | 1725 |

*Calculated quantities.

The terms and expressions which we have employed are used as terms of description and not of limitation, and we have no intention, in the use of such terms and expressions, of excluding any equivalents of the features shown and described or portions thereof, but recognize that various modifications are possible within the scope of the invention claimed.

We claim:

1. Portland cement containing about 0.2 to 0.4% by weight of casein to retard the setting rate of a water slurry of said cement at elevated temperatures.

2. Portland cement containing a small but effective quantity up to about 0.5% by weight of casein to retard the setting rate thereof and a small quantity of an anti-foaming agent sufficient to inhibit foaming when said cement and casein are mixed with water.

3. Portland cement containing an effective quantity of casin not greater than about 0.5% by weight of the cement on a dry basis and a small quantity of tributyl phosphate to inhibit foaming when said cement and casein are mixed with water.

4. A method of mixing Portland cement to retard the setting rate thereof comprising mixing said cement with water and a small quantity of casein amounting to about 0.2 to 0.4% by weight of the cement on a dry basis.

5. A method of mixing Portland cement to retard the setting rate thereof comprising mixing said cement with water, and small quantities of casein and an anti-foaming agent, the quantity of casein being not substantially more than 0.5% of the cement by weight.

6. A method of mixing Portland cement to retard the setting rate thereof comprising mixing said cement with water, an amount of casein not greater than about 0.5% by weight of the cement on a dry basis and a small quantity of tributyl phosphate.

7. A process of cementing a deep oil well comprising forming a Portland cement slurry with water containing small amounts of casein to retard the setting rate of said cement and an anti-foaming agent, and pumping said slurry to the location to be cemented in the well.

8. An hydraulic cement slurry having a retarded setting rate for cementing an oil well and consisting essentially of Portland cement, water, and casein in an effective quantity that substantially retards the setting rate of the cement up to about 0.5% of the cement by weight on a dry basis, to retard the setting rate of the cement in the slurry at elevated temperatures.

9. An hydraulic cement slurry containing Portland cement, water, and a small quantity of casein to retard the setting rate of said slurry at elevated temperatures, said quantity of casein being about 0.2 to 0.4% of the cement by weight on a dry basis.

10. A cement composition for cementing deep oil wells, said composition consisting essentially of Portland cement and a sufficient amount of casein not exceeding about 0.5% of the cement by weight to substantially retard the setting rate of the cement at temperatures of 140° F. and above, said composition having the property after vigorous mixing with water of setting to form a dense compact mass.

11. A cement composition for cementing deep oil wells, said composition comprising principally Portland cement and about 0.2 to 0.5% of casein based on the weight of cement to retard the setting thereof at elevated temperatures.

12. A cement composition for cementing deep oil wells, said composition consisting substantially entirely of Portland cement and an amount of casein sufficient to retard substantially the setting thereof at elevated temperatures but not exceeding about 0.5% of the cement by weight.

13. A cement composition for cementing deep oil wells, said composition having the characteristic properties of Portland cement except for a retarded setting rate and containing as its chemically active ingredients Portland cement and casein in a sufficient quantity up to about 0.5% by weight of the cement to substantially retard the setting rate thereof at temperatures of 140° F. and above.

14. A method of mixing Portland cement for use in deep oil wells comprising mixing said cement with a sufficient amount of casein up to about 0.5% by weight of the cement on a dry basis to form a slurry having a retarded setting rate at elevated temperatures and capable of setting after vigorous agitation to form a dense compact mass.

ERNST GRUENWALD.
HARVEY R. DURBIN.
WILLIAM H. TILLEY.